United States Patent
Hayashi et al.

(10) Patent No.: US 9,566,853 B2
(45) Date of Patent: Feb. 14, 2017

(54) VEHICLE

(75) Inventors: Tsuyoshi Hayashi, Miyoshi (JP); Kenji Kimura, Miyoshi (JP); Takurou Nakayama, Okazaki (JP); Nobuyoshi Fujiwara, Toyota (JP); Akihiro Sato, Nagoya (JP); Hirotaka Watanabe, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/240,989

(22) PCT Filed: Aug. 30, 2011

(86) PCT No.: PCT/JP2011/004835
§ 371 (c)(1),
(2), (4) Date: Feb. 25, 2014

(87) PCT Pub. No.: WO2013/030883
PCT Pub. Date: Mar. 7, 2013

(65) Prior Publication Data
US 2014/0216842 A1    Aug. 7, 2014

(51) Int. Cl.
*B60K 1/04* (2006.01)
*B60K 6/28* (2007.10)
(Continued)

(52) U.S. Cl.
CPC .............. *B60K 1/04* (2013.01); *H01M 2/1077* (2013.01); *H01M 10/625* (2015.04);
(Continued)

(58) Field of Classification Search
CPC  H01M 2/1072; H01M 2/1083; H01M 2/1077; H01M 16/00; B60R 16/04; B60K 1/04; B60K 2001/0405; B60K 2001/045; B60K 2001/0416
See application file for complete search history.

(56) References Cited

U.S. PATENT DOCUMENTS 4,401,942 A * 8/1983 Renz ...................... H02H 3/365
324/427
7,399,554 B2 * 7/2008 Kejha ................ H01M 10/441
320/103
(Continued)

FOREIGN PATENT DOCUMENTS

CN         1874051        12/2006
CN        101449419        6/2009
(Continued)

*Primary Examiner* — J. Allen Shriver, II
*Assistant Examiner* — Travis Coolman
(74) *Attorney, Agent, or Firm* — Finnegan, Henderson, Farabow, Garrett & Dunner, LLP

(57) ABSTRACT

A vehicle includes a motor serving as a driving source for running the vehicle, and a high-power assembled battery and a high-capacity assembled battery each capable of supplying an electric power to the motor and placed in a luggage space. The high-power assembled battery is capable of charge and discharge with a current relatively larger than that in the high-capacity assembled battery. The high-capacity assembled battery has an energy capacity relatively larger than that of the high-power assembled battery and has a higher dependence of battery characteristic on temperature than that of the high-power assembled battery. The high-capacity assembled battery is placed over the high-power assembled battery in the vehicle.

10 Claims, 9 Drawing Sheets

(51) Int. Cl.
  *H01M 2/10* (2006.01)
  *H01M 10/625* (2014.01)
  *H01M 10/647* (2014.01)
  *H01M 10/643* (2014.01)
  *H01M 10/66* (2014.01)
  *H01M 10/6561* (2014.01)
  *H01M 10/6566* (2014.01)

(52) U.S. Cl.
  CPC ....... *H01M 10/643* (2015.04); *H01M 10/647* (2015.04); *H01M 10/6561* (2015.04); *H01M 10/6566* (2015.04); *H01M 10/66* (2015.04); *B60K 2001/0416* (2013.01); *H01M 2/1083* (2013.01); *H01M 2220/20* (2013.01)

(56) References Cited

U.S. PATENT DOCUMENTS

| | | | | |
|---|---|---|---|---|
| 7,953,533 B2 * | 5/2011 | Tsuda | ............... | B60W 10/30 180/65.275 |
| 7,997,367 B2 * | 8/2011 | Nakamura | ............... | 180/68.5 |
| 8,116,924 B2 * | 2/2012 | Wakashiro | ............... | B60W 10/02 180/65.21 |
| 8,305,411 B1 * | 11/2012 | Yamamoto | ............... | B41J 2/375 347/223 |
| 8,476,863 B2 * | 7/2013 | Paasch | ............... | B60L 8/006 180/165 |
| 8,562,469 B2 * | 10/2013 | Yang | ............... | B60K 6/48 180/65.235 |
| 8,584,779 B2 * | 11/2013 | Tsuchiya et al. | ............. | 180/68.5 |
| 8,593,101 B2 * | 11/2013 | Iwahori | ............... | B60L 7/14 180/65.21 |
| 8,708,070 B2 * | 4/2014 | Tsuchida | ............... | B60K 6/365 123/196 R |
| 8,741,465 B2 * | 6/2014 | Nagata et al. | ............... | 429/120 |
| 8,849,491 B2 * | 9/2014 | Higashitani | ........... | B60W 10/08 180/65.1 |
| 8,875,828 B2 * | 11/2014 | Rawlinson et al. | ......... | 180/68.5 |
| 2008/0196957 A1 | 8/2008 | Koike et al. | | |
| 2009/0141447 A1 | 6/2009 | Soma et al. | | |
| 2009/0142650 A1 * | 6/2009 | Okada | ............... | H01M 2/1077 429/71 |
| 2010/0094493 A1 * | 4/2010 | Atsumi | ............... | B60K 6/28 701/22 |
| 2010/0121513 A1 * | 5/2010 | Itoh | ............... | B60K 6/365 701/22 |
| 2010/0196755 A1 * | 8/2010 | Park | ............... | H01M 2/1083 429/163 |
| 2010/0332062 A1 * | 12/2010 | Goto | ............... | B60K 6/485 701/22 |
| 2012/0203415 A1 * | 8/2012 | Akutsu | ............... | B60K 6/26 701/22 |
| 2012/0330488 A1 * | 12/2012 | Sadler | ............... | H02J 7/0024 701/22 |
| 2014/0162839 A1 * | 6/2014 | Miyazaki | ............... | B60K 6/48 477/5 |

FOREIGN PATENT DOCUMENTS

| | | |
|---|---|---|
| CN | 201766129 | 3/2011 |
| JP | 2007-8443 | 1/2007 |
| JP | 2007-311290 | 11/2007 |
| JP | 2008-218272 | 9/2008 |
| JP | 2011-113702 | 6/2011 |

* cited by examiner

VEHICLE

CROSS-REFERENCE TO RELATED APPLICATIONS

This application is a national phase application of International Application No. PCT/JP2011/004835, filed Aug. 30, 2011, the content of which is incorporated herein by reference.

TECHNICAL FIELD

The present invention relates to a vehicle including a plurality of assembled batteries having different characteristics.

BACKGROUND ART

A battery system described in Patent Document 1 includes a high-capacity battery and a high-power battery which are connected in parallel to a load. The high-capacity battery has an energy capacity larger than that of the high-power battery. The high-power battery allows charge and discharge with a current larger than that in the high-capacity battery.

PRIOR ART DOCUMENT

Patent Document

[Patent Document 1] Japanese Patent Laid-Open No. 2006-079987

DISCLOSURE OF THE INVENTION

Problems to be Solved by the Invention

Patent Document 1 has disclosed a vehicle including the high-capacity battery and the high-power battery but has not made any disclosure of an arrangement of the high-capacity battery and the high-power battery. The high-capacity battery and the high-power battery may have different characteristics or may be used in different manners. The salability of the vehicle may be reduced unless the high-capacity battery and the high-power battery are mounted on the vehicle in view of the characteristics and the like of the high-capacity battery and the high-power battery.

Means for Solving the Problems

A vehicle according to the present invention has a motor serving as a driving source for running the vehicle and assembled batteries each capable of supplying an electric power to the motor. The assembled batteries are placed in a luggage space of the vehicle and include a high-power assembled battery and a high-capacity assembled battery which are constituted by secondary batteries, respectively. The high-power assembled battery is capable of charge and discharge with a current relatively larger than that in the high-capacity assembled battery. The high-capacity assembled battery has an energy capacity relatively larger than that of the high-power assembled battery and has a higher dependence of battery characteristic on temperature than that of the high-power assembled battery. The high-capacity assembled battery is placed over the high-power assembled battery in the vehicle.

The placement of the high-capacity assembled battery over the high-power assembled battery can facilitate dissipation of heat produced in the high-capacity assembled battery. Since the high-capacity assembled battery has the higher dependence of battery characteristic on temperature than the high-power assembled battery, the facilitated heat dissipation from the high-capacity assembled battery can ensure the battery characteristics of the high-capacity assembled battery. The battery characteristics include the input/output power of the battery, the capacity of the battery and the like.

In running the vehicle including an engine serving as a driving source for running the vehicle by using an output from the motor with the engine stopped, the high-capacity assembled battery can supply a more electric power to the motor than that in the high-power assembled battery. The preferential use of the high-capacity assembled battery can ensure the running distance of the vehicle with the electric energy to improve the fuel economy.

In the running of the vehicle using the output from the motor with the engine stopped, the frequency of use of the high-capacity assembled battery is higher than the frequency of use of the high-power assembled battery. In running of the vehicle using the output from the motor with the engine stopped, the proportion of the electric power supplied from the high-capacity assembled battery to the motor in the electric power supplied to the motor is higher than the proportion of the electric power supplied from the high-power assembled battery to the motor.

The high-capacity assembled battery can be charged with an electric power supplied from an external power source. In running of the vehicle using the output from the motor with the engine stopped, the high-capacity assembled battery can be discharged until the SOC (State Of Charge) of the high-capacity assembled battery is close to 0%. After the discharge of the high-capacity assembled battery, the high-capacity assembled battery is charged by using the external power source to allow the reuse of the high-capacity assembled battery in running of the vehicle using the output from the motor with the engine stopped.

The high-capacity assembled battery can have a size larger than that of the high-power assembled battery to increase the capacity of the high-capacity assembled battery, thereby extending the running distance of the vehicle when the electric energy is used. In the luggage space, space for placing the assembled battery can be provided easily in an upper portion of the vehicle. Since the high-capacity assembled battery is placed above the high-power assembled battery, the high-capacity assembled battery larger than the high-power assembled battery can be placed readily in the luggage space.

The high-capacity assembled battery is replaced at a frequency higher than that of the high-power assembled battery. Since the high-capacity assembled battery has the higher dependence on temperature than the high-power assembled battery, the high-capacity assembled battery may be deteriorated more easily than the high-power assembled battery in response to temperature changes. In addition, when the high-capacity assembled battery continues to be used at a frequency higher than that of the high-power assembled battery, the high-capacity assembled battery may be deteriorated more easily than the high-power assembled battery. Once the high-capacity assembled battery is deteriorated, the high-capacity assembled battery needs replacement. The high-capacity assembled battery is used to ensure the running distance of the vehicle as described above, and the capacity of the high-capacity assembled battery can be changed to respond to the need of a user. In this case, the high-capacity assembled battery also needs replacement.

Thus, the frequency of replacement of the high-capacity assembled battery is higher than that of the high-power assembled battery.

Since the high-capacity assembled battery is placed above the high-power assembled battery, an operator easily accesses the high-capacity assembled battery. Thus, the operator can easily replace the high-capacity assembled battery.

The high-power assembled battery can include a plurality of cells connected in series. The high-capacity assembled battery can include a plurality of cells connected in parallel. A square-type cell can be used as the cell of the high-power assembled battery, and a cylinder-type cell can be used as the cell of the high-capacity assembled battery.

Specifically, a battery pack including the high-power assembled battery can include a plurality of square-type cells placed side by side in a predetermined direction and a case accommodating the plurality of square-type cells. A battery pack including the high-capacity assembled battery can include a plurality of cylinder-type cells, a holder supporting the plurality of cylinder-type cells, and a case accommodating the plurality of cylinder-type cells and the holder. The holder can be provided with through holes into which each of the plurality of cylinder-type cells is inserted. An end face of the holder is in contact with the case. The cylinder-type cell extends in a direction orthogonal to a predetermined plane (the plane on which the holder is placed), and the plurality of cylinder-type cells are placed in order within the predetermined plane.

The configuration of the battery pack including the high-power assembled battery and the battery pack including the high-capacity assembled battery described as above can provide greater rigidity for the battery pack including the high-capacity assembled battery than for the battery pack including the high-power assembled battery. Even when an external force is applied to the case of the battery pack including the high-capacity assembled battery, the external force can be received by the holder in contact with the case. Since the high-capacity assembled battery is placed above the high-power assembled battery, the high-capacity assembled battery is at the position where it often receives the external force. The greater rigidity provided for the battery pack including the high-capacity assembled battery than that for the battery pack including the high-power assembled battery can withstand the external force.

A heat exchange medium used in temperature adjustment of the high-power assembled battery can enter into space formed between two of the cells adjacent in the predetermined direction to exchange heat with the high-power assembled battery. A heat exchange medium used in temperature adjustment of the high-capacity assembled battery can move along the predetermined plane to exchange heat with the high-capacity assembled battery.

Such a flow path for the heat exchange medium in the high-power assembled battery has a pressure loss which tends to be higher than that in the high-capacity assembled battery. As the pressure loss is increased, noise is produced more easily. Since the high-capacity assembled battery is placed above the high-power assembled battery, the high-capacity assembled battery can block the noise produced in the high-power assembled battery. This can prevent the noise produced in the high-power assembled battery from being directed toward the outside (especially, the space where passengers ride).

MODE FOR CARRYING OUT THE INVENTION

An embodiment of the present invention will hereinafter be described.

Embodiment 1

Figure 1:
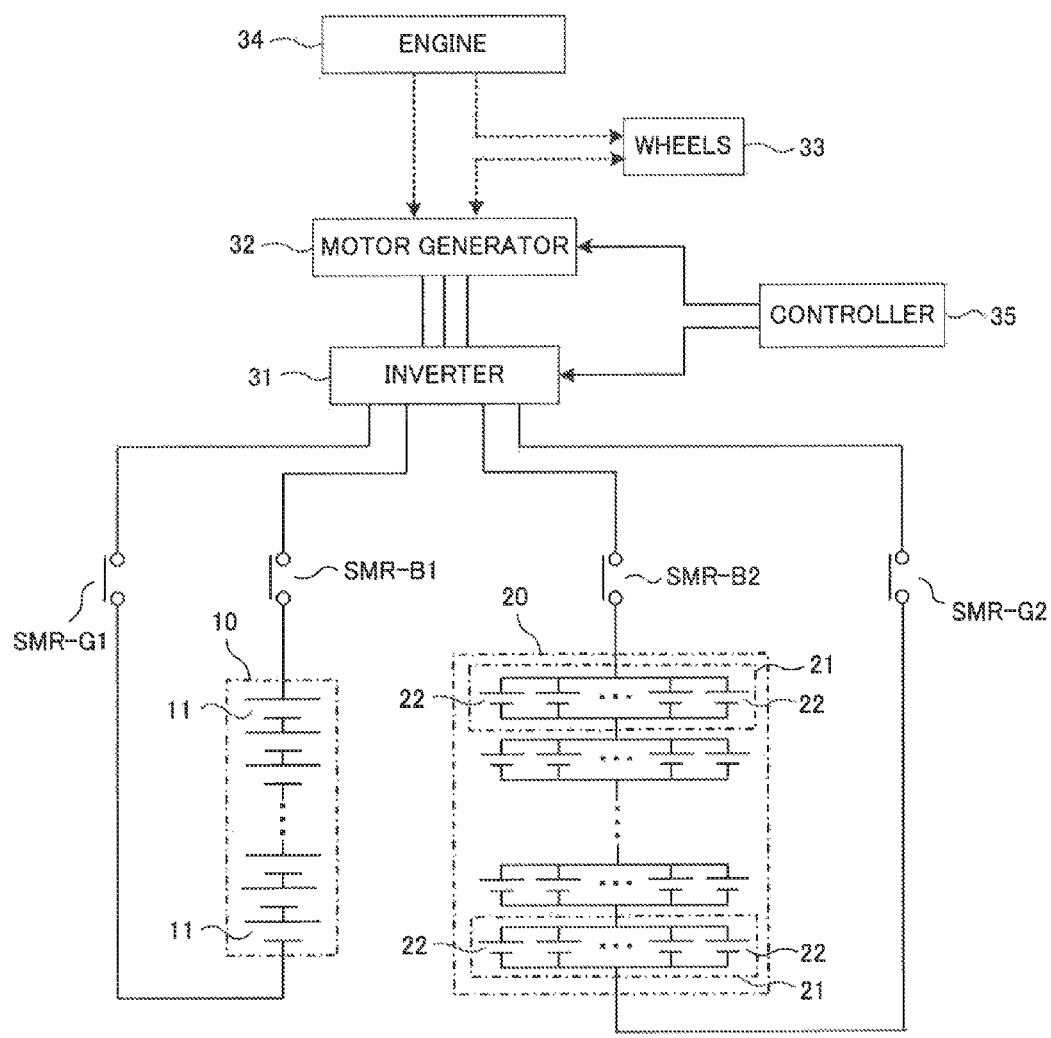
FIG. 1 is a diagram showing the configuration of a battery system.

A battery system according to the present embodiment is described with reference to FIG. 1. FIG. 1 is a schematic diagram showing the configuration of the battery system. The battery system according to the present embodiment is mounted on a vehicle. In FIG. 1, connections indicated by solid lines represent electrical connections, and connections indicated by dotted lines represent mechanical connections.

The battery system has a high-power assembled battery 10 and a high-capacity assembled battery 20 which are connected in parallel to each other. The high-power assembled battery 10 is connected to an inverter 31 through system main relays SMR-B1 and SMR-G1. The high-capacity assembled battery 20 is connected to the inverter 31 through system main relays SMR-B2 and SMR-G2. The inverter 31 converts a DC power supplied from each of the assembled batteries 10 and 20 into an AC power.

A motor generator 32 (AC motor) is connected to the inverter 31 and receives the AC power supplied from the inverter 31 to generate a kinetic energy for running the vehicle. The motor generator 32 is connected to wheels 33. An engine 34 is connected to the wheels 33, and a kinetic energy generated by the engine 34 is transferred to the wheels 33.

For decelerating or stopping the vehicle, the motor generator 32 converts a kinetic energy produced in braking the vehicle into an electric energy (AC power). The inverter 31 converts the AC power generated by the motor generator 32 into a DC power and supplies the DC power to the assembled batteries 10 and 20. This allows the assembled batteries 10 and 20 to store the regenerative power.

A controller 35 outputs a control signal to each of the inverter 31 and the motor generator 32 to control the driving thereof. The controller 35 also outputs a control signal to each of the system main relays SMR-B1 and B2, and SMR-G1 and G2 to make switching thereof between ON and OFF.

When the system main relays SMR-B1 and SMR-G1 are ON, charge and discharge of the high-power assembled battery 10 are allowed. When the system main relays SMR-B1 and SMR-G1 are OFF, the charge and discharge of the high-power assembled battery 10 are inhibited. When the system main relays SMR-B2 and SMR-G2 are ON, charge and discharge of the high-capacity assembled battery 20 are allowed. When the system main relays SMR-B2 and SMR-G2 are OFF, the charge and discharge of the high-capacity assembled battery 20 are inhibited.

While the assembled batteries 10 and 20 are connected to the inverter 31 in the present embodiment, the present invention is not limited thereto. Specifically, a step-up circuit may be placed on the current path between the assembled batteries 10 and 20 and the inverter 31. This arrangement enables the step-up circuit to increase the voltage output from each of the assembled batteries 10 and 20.

The vehicle according to the present embodiment includes not only the assembled batteries 10 and 20 but also the engine 34 as the power source for running the vehicle. The engine 34 includes one which employs gasoline, a diesel fuel, or a biofuel.

The vehicle according to the present embodiment can be run by using only the output from the high-power assembled battery 10 and the output from the high-capacity assembled battery 20. This running mode is referred to as an EV (Electric Vehicle) mode. For example, the vehicle can be run by discharging the high-capacity assembled battery 20 from near 100% to near 0% SOC (State of Charge). After the SOC of the high-capacity assembled battery 20 reaches near 0%, an external power source can be used to charge the high-capacity assembled battery 20. The external power source refers to a power source placed outside the vehicle and provided as a unit separate from the vehicle. A commercial power source can be used as the external power source, for example. When the commercial power source is used, a charger is required to convert an AC power into a DC power.

When a driver presses an accelerator pedal to increase the output required of the vehicle in the EV running mode, not only the output from the high-capacity assembled battery 20 but also the output from the high-power assembled battery 10 can be used to run the vehicle. The combinational use of the high-capacity assembled battery 20 and the high-power assembled battery 10 can ensure the battery output in accordance with the pressing of the accelerator pedal to improve the drivability.

After the SOC of the high-capacity assembled battery 20 reaches near 0%, the high-power assembled battery 10 and the engine 34 can be used in combination to run the vehicle. This running mode is referred to as an HV (Hybrid Vehicle) running mode. In the HV running mode, the charge and discharge of the high-power assembled battery 10 can be controlled such that the SOC of the high-power assembled battery 10 is changed on the basis of a predefined reference SOC, for example.

Specifically, when the SOC of the high-power assembled battery 10 is higher than the reference SOC, the high-power assembled battery 10 can be discharged to bring the SOC of the high-power assembled battery 10 closer to the reference SOC. Alternatively, when the SOC of the high-power assembled battery 10 is lower than the reference SOC, the high-power assembled battery 10 can be charged to bring the SOC of the high-power assembled battery 10 closer to the reference SOC. In the HV running mode, not only the high-power assembled battery 10 but also the high-capacity assembled battery 20 can be used. Specifically, the capacity of the high-capacity assembled battery 20 is reserved, and the high-capacity assembled battery 20 can be discharged in the HV running mode. In addition, the regenerative power may be stored in the high-capacity assembled battery 20.

As described above, the high-capacity assembled battery 20 can be used mainly in the EV running mode, and the high-power assembled battery 10 can be used mainly in the HV running mode. The main use of the high-capacity assembled battery 20 in the EV running mode means the following two cases. Firstly, it means that the frequency of use of the high-capacity assembled battery 20 is higher than that of the high-power assembled battery 10 in the EV running mode. Secondly, when the high-capacity assembled battery 20 and the high-power assembled battery 10 are used in combination in the EV running mode, the main use of the high-capacity assembled battery 20 means that the proportion of the electric power output therefrom in the total electric power used in running of the vehicle is higher than the proportion of the electric power output from the high-power assembled battery 10. The total electric power refers to an electric power used in a predetermined running time or a running distance, rather than a momentary electric power.

Figure 2:
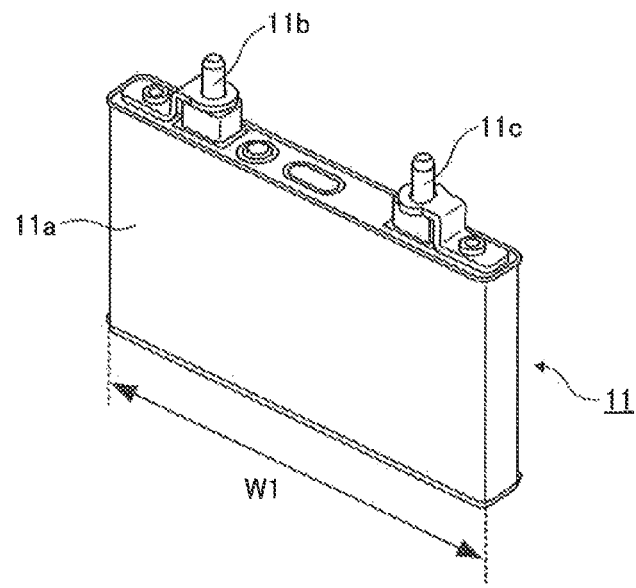
FIG. 2 is an external view of a cell used in a high-power assembled battery.

As shown in FIG. 1, the high-power assembled battery 10 has a plurality of cells 11 connected in series. A secondary battery such as a nickel metal hydride battery or a lithium-ion battery can be used as the cell 11. The number of the cells 11 constituting the high-power assembled battery 10 can be set as appropriate by taking account of the output required of the high-power assembled battery 10 and the like. As shown in FIG. 2, the cell 11 is a so-called square-type cell. The square-type cell refers to a cell having an outer shape conformed to a rectangle.

In FIG. 2, the cell 11 has a battery case 11a conformed to a rectangle. The battery case 11a accommodates a power-generating element performing charge and discharge. The power-generating element has a positive electrode component, a negative electrode component, and a separator placed between the positive electrode element and the negative electrode element. The separator contains an electrolytic solution. The positive electrode component has a collector plate and a positive electrode active material layer formed on a surface of the collector plate. The negative electrode component has a collector plate and a negative electrode active material layer formed on a surface of the collector plate.

A positive electrode terminal 11b and a negative electrode terminal 11c are placed on an upper face of the battery case 11a. The positive electrode terminal 11b is connected electrically to the positive electrode component of the power-generating element, and the negative electrode terminal 11c is connected electrically to the negative electrode component of the power-generating element.

Figure 3:
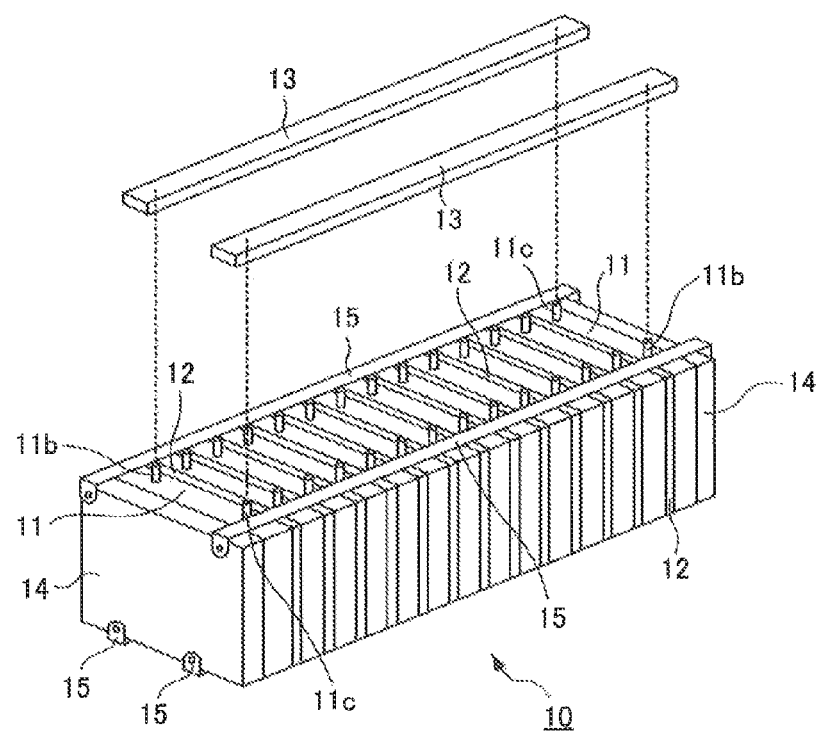
FIG. 3 is an external view of the high-power assembled battery.

As shown in FIG. 3, the high-power assembled battery 10 has the plurality of cells 11 placed side by side in one direction. A partitioning plate 12 is placed between adjacent two of the cells 11. The partitioning plate 12 can be made of an insulating material such as resin to ensure the insulating state between the two cells 11.

The use of the partitioning plate 12 can provide space on an outer face of the cell 11. Specifically, the partitioning plate 12 can have a protruding portion which protrudes toward the cell 11, and the end of the protruding portion can be brought into contact with the cell 11 to provide the space between the partitioning plate 12 and the cell 11. In this space, air (corresponding to a heat exchange medium) used for adjusting the temperature of the cell 11 can be moved.

When the cell 11 generates heat due to charge and discharge or the like, air for cooling can be introduced into the space provided between the partitioning plate 12 and the cell 11. The air for cooling can exchange heat with the cell 11 to suppress a rise in temperature of the cell 11. Alternatively, when the cell 11 is excessively cooled, air for heating can be introduced into the space provided between the partitioning plate 12 and the cell 11. The air for heating can exchange heat with the cell 11 to suppress a drop in temperature of the cell 11. The temperature adjustment of the cell 11 may be performed by using a gas containing a constituent different from the air.

The plurality of cells 11 are connected electrically in series through two bus bar modules 13. The bus bar module 13 has a plurality of bus bars and a holder for holding the plurality of bus bars. The bus bar is made of a conductive material and is connected to the positive electrode terminal 11$b$ of one of two adjacent cells 11 and the negative electrode terminal 11$c$ of the other cell 11. The holder is formed of an insulating material such as resin.

A pair of end plates is placed at both ends of the high-power assembled battery 10 in the direction in which the plurality of cells 11 are arranged. Restraint bands 15 extending in the direction of the arrangement of the plurality of cells 11 are connected to the pair of end plates 14. This can apply a restraint force to the plurality of cells 11. The restraint force refers to a force with which each of the cells 11 is held tightly in the direction of the arrangement of the plurality of cells 11. The restraint force applied to the cells 11 can suppress expansion of the cell 11 or the like.

In the present embodiment, two restraint bands 15 are placed on an upper face of the high-power assembled battery 10 and two restraint bands 15 are placed on a lower face of the high-power assembled battery 10. The number of the restraint bands 15 can be set as appropriate. It is only required that the use of the restraint bands 15 and the end plates 14 can apply the restraint force to the cells 11. Alternatively, the restraint force may not be applied to the cells 11, and the end plates 14 and the restraint bands 15 may be omitted.

While the plurality of cells 11 are arranged in one direction in the present embodiment, the present invention is not limited thereto. For example, a plurality of cells may be used to constitute a single battery module, and a plurality of such battery modules may be arranged in one direction.

As shown in FIG. 1, the high-capacity assembled battery 20 has a plurality of battery blocks 21 connected in series. Each of the battery blocks 21 has a plurality of cells 22 connected in parallel. The number of the battery blocks 21 and the number of the cells 22 included in each of the battery blocks 21 can be set as appropriate in view of the output required of the high-capacity assembled battery 20, the capacity thereof or the like. While the plurality of cells 22 are connected in parallel in the battery block 21 of the present embodiment, the present invention is not limited thereto.

Specifically, a plurality of battery modules each including a plurality of cells 22 connected in series may be provided and connected in parallel to constitute the battery block 21.

Figure 4:
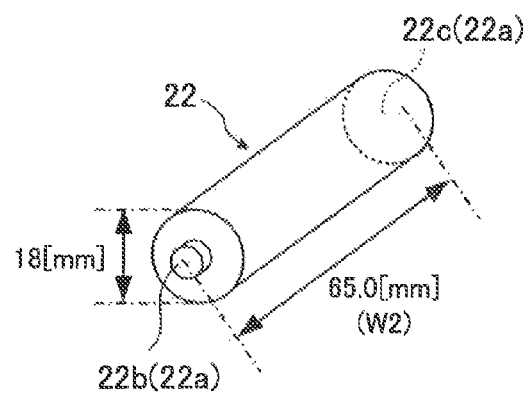
FIG. 4 is an external view of a cell used in a high-capacity assembled battery.

A secondary battery such as a nickel metal hydride battery or a lithium-ion battery can be used as the cell 22. As shown in FIG. 4, the cell 22 is a so-called cylinder-type cell. The cylinder-type cell refers to a cell having an outer shape conformed to a cylinder.

As shown in FIG. 4, the cylinder-type cell 22 has a cylinder-type battery case 22$a$. The battery case 22$a$ accommodates a power-generating element. The power-generating element in the cell 22 has constituent members similar to the constituent members of the power-generating element in the cell 11.

A positive electrode terminal 22$b$ and a negative electrode terminal 22$c$ are provided at both ends of the cell 22 in a longitudinal direction. The positive electrode terminal 22$b$ and the negative electrode terminal 22$c$ form the battery case 22$a$. The positive electrode terminal 22$b$ is connected electrically to a positive electrode component of the power-generating element, and the negative electrode terminal 22$c$ is connected electrically to a negative electrode component of the power-generating element. The cell 22 of the present embodiment is a battery called 18650 type having a diameter of 18 mm and a length of 65.0 mm. The cell 22 may be a cell having dimensions different from those of the 18650 type.

The size of the square-type cell 11 is larger than the size of the cylinder-type cell 22. The size of each of the cells 11 and 22 refers to the size of the portion thereof having the largest dimension. Specifically, in the configuration of the cell 11 shown in FIG. 2, a length W1 can be regarded as the size of the cell 11. In the configuration of the cell 22 shown in FIG. 4, a length W2 can be regarded as the size of the cell 22. The length W1 is larger than the length W2.

Figure 5:
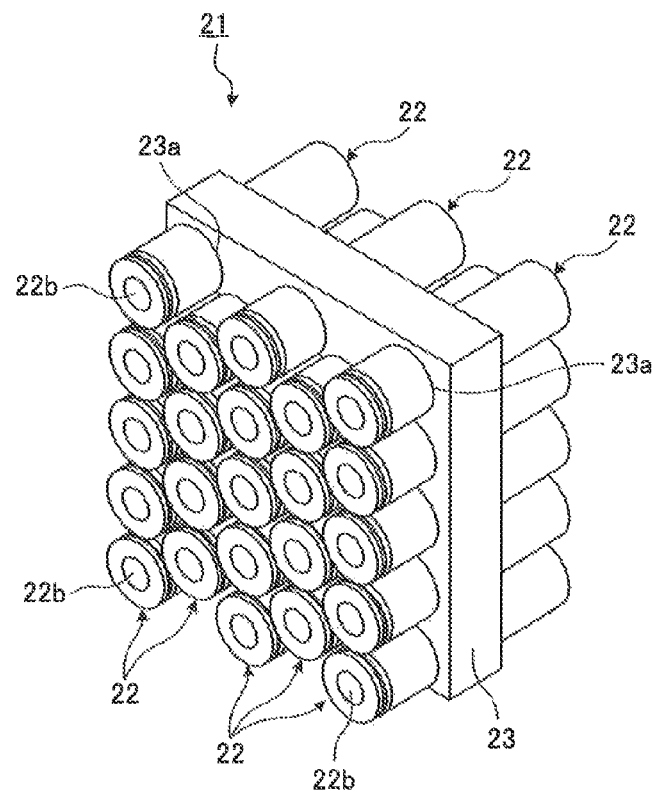
FIG. 5 is an external view of a battery block used in the high-capacity assembled battery.

As shown in FIG. 5, the battery block 21 has the plurality of cells 22 and a holder 23 which holds the plurality of cells 22. The plurality of battery blocks 21 are arranged in order to constitute the high-capacity assembled battery 20. The plurality of battery blocks 21 are connected in series through an electrical cable or the like. The high-capacity assembled battery 20 is used to ensure the running distance in the EV running mode, and the many cells 22 are used. Thus, the size of the high-capacity assembled battery 20 tends to be larger than the size of the high-power assembled battery 10.

The holder 23 has through holes 23$a$ and each cell 22 is inserted into the through hole 23$a$. The number of the through holes 23$a$ provided is equal to the number of the cells 22. The plurality of cells 22 are placed such that the positive electrode terminals 22$b$ (or the negative electrode terminals 22$c$) are located on the same side of the holder 23. The plurality of positive electrode terminals 22$b$ are connected to a single bus bar, and the plurality of negative electrode terminals 22$c$ are connected to a single bus bar. This achieves the electrical parallel connection of the plurality of cells 22.

The cell 22 extends in a direction orthogonal to a plane on which the holder 23 is placed. The plurality of cells 22 are placed in order within the plane on which the holder 23 is placed. The positions to place the plurality of cells 22 can be set as appropriate within the plane on which the holder 23 is placed.

While the single holder 23 is used in the battery block 21 of the present embodiment, a plurality of holders 23 may be used. For example, one of the holders 23 can be used to hold the cells 22 on the side of the positive electrode terminals 22b, and the other holder 23 can be used to hold the cells 22 on the side of the negative electrode terminals 22c.

Next, description is made of the characteristics of the cell 11 used in the high-power assembled battery 10 and the characteristics of the cell 22 used in the high-capacity assembled battery 20. Table 1 shows the comparison between the characteristics of the cells 11 and 22. In Table 1, "high" and "low" represent the relative levels when the two cells 11 and 22 are compared. Specifically, "high" represents a higher level than that of the compared cell, and "low" represents a lower level than that of the compared cell.

TABLE 1

|  | cell 11 (high-power type) | cell 22 (high-capacity type) |
| --- | --- | --- |
| output density | high | low |
| power capacity density | low | high |
| dependence of input/output on temperature | low | high |
| dependence of battery life on temperature | low | high |

The cell 11 has an output density higher than that of the cell 22. The output density of each of the cells 11 and 22 can be represented as an electric power per unit mass of the cell (in W/kg) or an electric power per unit volume of the cell (in W/L). When the cells 11 and 22 have equal masses or volumes, the output (W) of the cell 11 is higher than the output (W) of the cell 22.

The output density in the electrode component (positive electrode component or negative electrode component) of each of the cells 11 and 22 can be represented as a current value per unit area of the electrode component (in $mA/cm^2$). The output density of the electrode component of the cell 11 is higher than that of the cell 22. When the electrode components have equal areas, the value of a current capable of passing through the electrode component of the cell 11 is higher than the value of a current capable of passing through the electrode component of the cell 22.

The cell 22 has an electric power capacity density higher than that of the cell 11. The electric power capacity density of each of the cells 11 and 22 can be represented as a capacity per unit mass of the cell (in Wh/kg) or a capacity per unit volume of the cell (in Wh/L). When the cells 11 and 22 have equal masses or volumes, the electric power capacity (Wh) of the cell 22 is higher than the electric power capacity (Wh) of the cell 11.

The capacity density in the electrode component of each of the cells 11 and 22 can be represented as a capacity per unit mass of the electrode component (in mAh/g) or a capacity per unit volume of the electrode component (in mAh/cc), for example. The capacity density of the electrode component of the cell 22 is higher than that of the cell 11. When the electrode components have equal masses or volumes, the capacity of the electrode component of the cell 22 is higher than the capacity of the electrode component of the cell 11.

Figure 6:
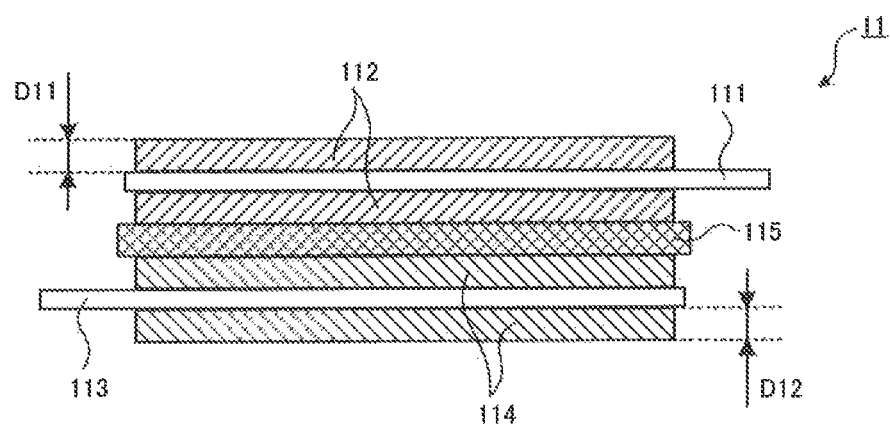
FIG. 6 is a diagram showing the configuration of a power-generating element used in the cell of the high-power assembled battery.
Figure 7:
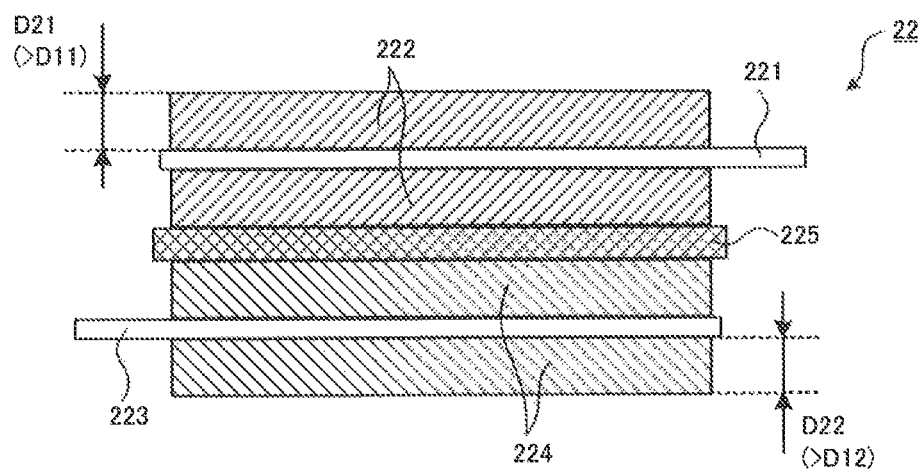
FIG. 7 is a diagram showing the configuration of a power-generating element used in a cell of the high-capacity assembled battery.

FIG. 6 is a schematic diagram showing the configuration of the power-generating element in the cell 11. FIG. 7 is a schematic diagram showing the configuration of the power-generating element in the cell 22.

In FIG. 6, the positive electrode component forming part of the power-generating element of the cell 11 has a collector plate 111 and an active material layer 112 formed on each face of the collector plate 111. When the cell 11 is a lithium-ion secondary battery, aluminum can be used as the material of the collector plate 111, for example. The active material layer 112 includes a positive electrode active material, a conductive material, a binder and the like.

The negative electrode component forming part of the power-generating element of the cell 11 has a collector plate 113 and an active material layer 114 formed on each face of the collector plate 113. When the cell 11 is a lithium-ion secondary battery, copper can be used as the material of the collector plate 113, for example. The active material layer 114 includes a negative electrode active material, a conductive material, a binder and the like.

A separator 115 is placed between the positive electrode component and the negative electrode component. The separator 115 is in contact with the active material layer 112 of the positive electrode component and the active material layer 114 of the negative electrode component. The positive electrode component, the separator 115, and the negative electrode component are layered in this order to constitute a laminate, and the laminate is wound, thereby making it possible to form the power-generating element.

While the active material layer 112 is formed on each face of the collector plate 111 and the active material layer 114 is formed on each face of the collector plate 113 in the present embodiment, the present invention is not limited thereto. Specifically, a so-called bipolar electrode can be used. The bipolar electrode has a positive electrode active material layer 112 formed on one face of a collector plate and a negative electrode active material layer 114 formed on the other face of the collector plate. A plurality of such bipolar electrodes are layered with separators interposed, so that the power-generating element can be formed.

In FIG. 7, the positive electrode component forming part of the power-generating element of the cell 22 has a collector plate 221 and an active material layer 222 formed on each face of the collector plate 221. When the cell 22 is a lithium-ion secondary battery, aluminum can be used as the material of the collector plate 221, for example. The active material layer 222 includes a positive electrode active material, a conductive material, a binder and the like.

The negative electrode component forming part of the power-generating element of the cell 22 has a collector plate 223 and an active material layer 224 formed on each face of the collector plate 223. When the cell 22 is a lithium-ion secondary battery, copper can be used as the material of the collector plate 223, for example. The active material layer 224 includes a negative electrode active material, a conductive material, a binder and the like. A separator 225 is placed between the positive electrode component and the negative electrode component. The separator 225 is in contact with the active material layer 222 of the positive electrode component and the active material layer 224 of the negative electrode component.

As shown in FIG. 6 and FIG. 7, a thickness D11 of the active material layer 112 is smaller than a thickness D21 of the active material layer 222 when the positive electrode components of the cell 11 and the cell 22 are compared. When the negative electrode components of the cell 11 and the cell 22 are compared, a thickness D12 of the active material layer 114 is smaller than a thickness D22 of the active material layer 224. The thicknesses D11 and D12 of the active material layers 112 and 114 smaller than the thicknesses D21 and D22 of the active material layers 222 and 224 can easily pass a current between the positive electrode component and the negative electrode component in the cell 11. Thus, the output density of the cell 11 is higher than the output density of the cell 22.

The volume per unit capacity (in cc/mAh) of the active material layer 112 is larger than that of the active material layer 222, and the volume per unit capacity of the active material layer 114 is larger than that of the active material layer 224. Since the thicknesses D21 and D22 of the active material layers 222 and 224 are larger than the thicknesses D11 and D12 of the active material layers 112 and 114, the capacity density of the cell 22 is higher than the capacity density of the cell 11.

Figure 8:
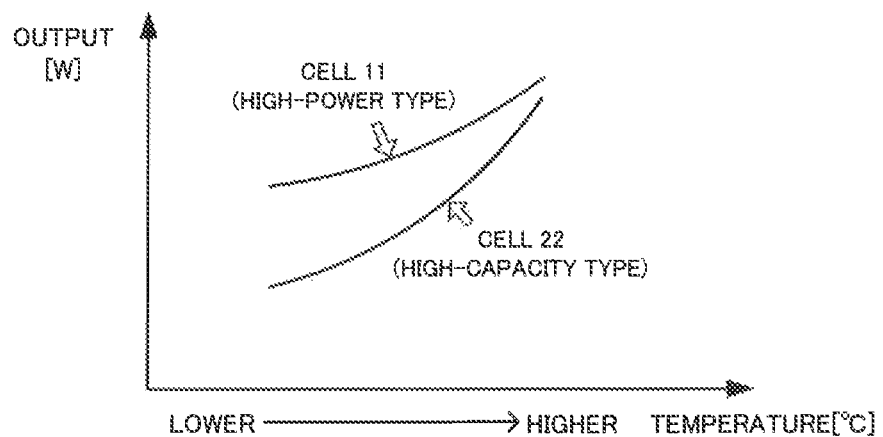
FIG. 8 is a graph showing the relationship between the output of the cell and temperature.

Next, description is made of the dependence of the battery on temperature. As shown in Table 1, the cell 22 has a higher dependence of input and output on temperature than that of the cell 11. Specifically, the input and output of the cell 22 are changed more easily than the input and output of the cell 11 in response to a temperature change. FIG. 8 shows the output characteristics of the cells 11 and 22 with respect to temperature. In FIG. 8, the horizontal axis represents the temperature and the vertical axis represents the output. While FIG. 8 shows the output characteristics of the cells 11 and 22, the input characteristics of the cells 11 and 22 have relationships similar to those shown in FIG. 8.

As shown in FIG. 8, the output performance of each of the cell (high-power type) 11 and the cell (high-capacity type) 22 is reduced as the temperature drops. The reduction rate of the output performance in the cell 11 is lower than the reduction rate of the output performance in the cell 22. In other words, the output performance of the cell 22 is more susceptible to the temperature than the output performance of the cell 11 and has a higher dependence on temperature than the cell 11.

Figure 9:
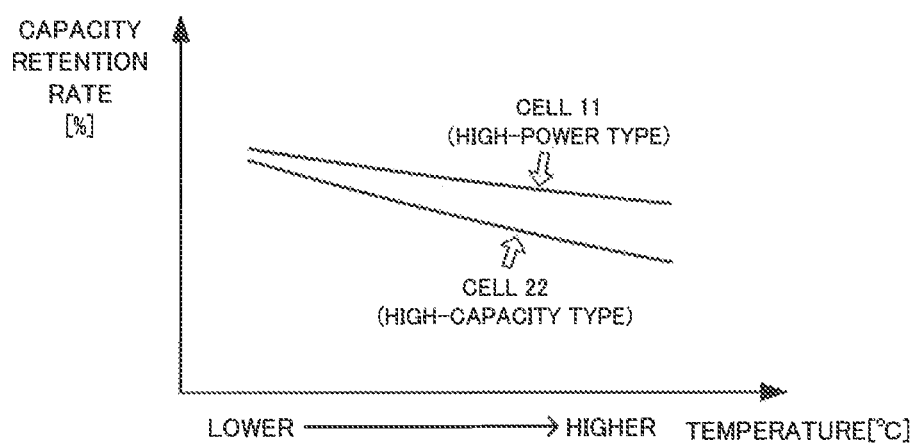
FIG. 9 is a graph showing the relationship between the capacity retention rate of the cell and temperature.

FIG. 9 is a graph showing the relationship between the capacity retention rate of each of the cells 11 and 22 and temperature. In FIG. 9, the horizontal axis represents the temperature and the vertical axis represents the capacity retention rate. The capacity retention rate is represented by the ratio between the capacity of each of the cells 11 and 22 in an initial state and the capacity of each of the cells 11 and 22 in a used state (deteriorated state) (deteriorated capacity/initial capacity). The initial state refers to the state immediately after each of the cells 11 and 22 is manufactured and before each of the cells 11 and 22 is used. The graph shown in FIG. 9 shows the capacity retention rates of the cells 11 and 22 after the cells are repeatedly charged and discharged at each temperature.

As shown in FIG. 9, the capacity retention rates of the cells 11 and 22 tend to be reduced as the temperature is higher. The reductions in the capacity retention rate represent the deterioration of the cells 11 and 22. The reduction rate of the capacity retention rate of the cell 22 with respect to the temperature rise is higher than that of the cell 11. In other words, the cell 22 is deteriorated more readily than the cell 11 with respect to the temperature rise (temperature change). In this manner, the high-capacity assembled battery 20 has a higher dependence on temperature than that of the high-power assembled battery 10.

Figure 10:
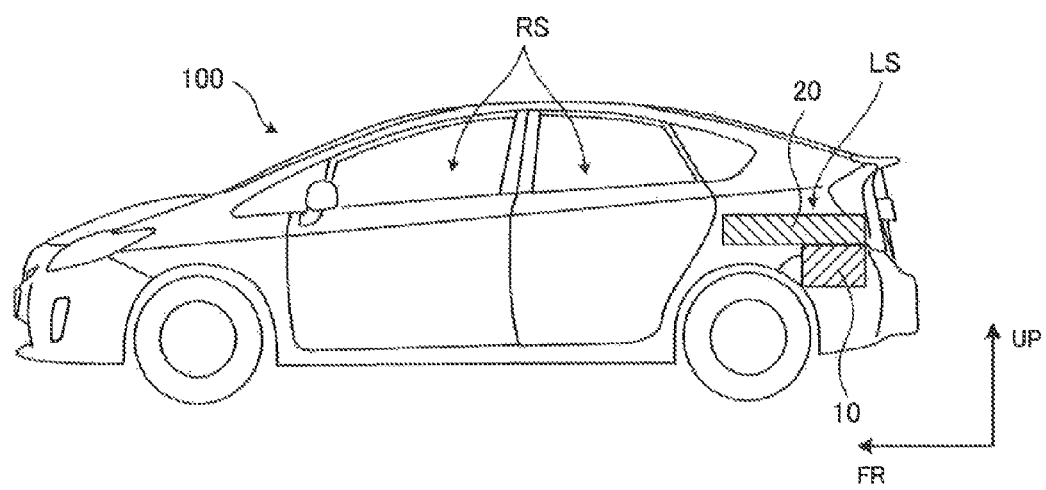
FIG. 10 is a schematic diagram of a vehicle on which the high-power assembled battery and the high-capacity assembled battery are mounted.

Next, description is made of the placement of the high-power assembled battery 10 and the high-capacity assembled battery 20 when they are mounted on the vehicle with reference to FIG. 10. In FIG. 10, a direction indicated by an arrow FR shows a forward direction of a vehicle 100, and a direction indicated by an arrow UP shows an upward direction of the vehicle 100.

The high-power assembled battery 10 and the high-capacity assembled battery 20 are placed in a luggage space LS, and the high-capacity assembled battery 20 is located above the high-power assembled battery 10. The luggage space LS is space for placing luggage, and part of the luggage space LS is used as the space for placing the assembled batteries 10 and 20.

A riding space RS is provided in front of the luggage space LS in the vehicle 100. The riding space RS is space where passengers ride, and is defined by the placement of seats. The vehicle 100 may be a vehicle in which the riding space RS is separated from the luggage space LS by a partitioning member, or a vehicle in which the riding space RS communicates with the luggage space LS.

Figure 11:
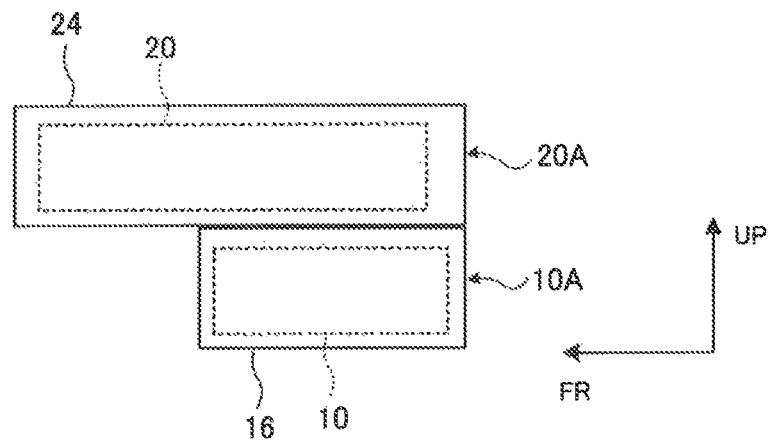
FIG. 11 is a diagram for explaining the placement of two battery packs.

In mounting the high-power assembled battery 10 and the high-capacity assembled battery 20 on the vehicle 100, the batteries 10 and 20 are mounted as battery packs 10A and 20A, respectively, on the vehicle 100 as shown in FIG. 11. The battery pack 10A has the high-power assembled battery 10 and a pack case 16 which accommodates the high-power assembled battery 10. The battery pack 20A has the high-capacity assembled battery 20 and a pack case 24 which accommodates the high-capacity assembled battery 20. The pack case 24 is fixed to an upper face of the pack case 16.

The battery packs 10A and 20A are fixed to the vehicle body. For example, the battery pack 10A can be housed in a recess portion formed in a floor panel of the vehicle 100. The recess portion can be used as space for accommodating a spare tire. The battery pack 20A placed over the battery pack 10A can be fixed to the vehicle body such as the floor panel or a cross member.

Figure 12:
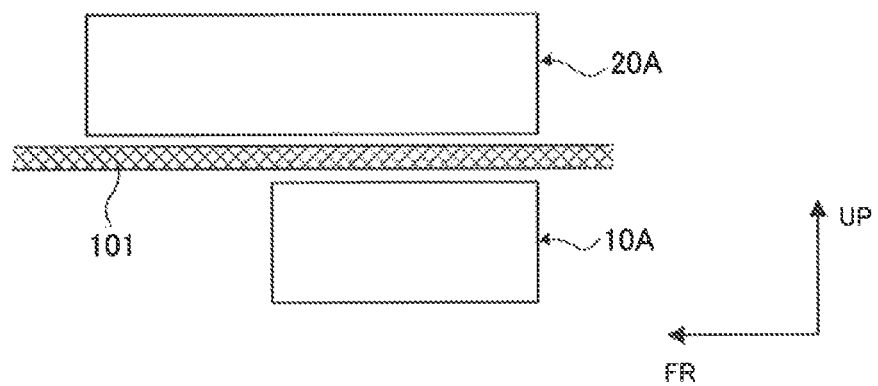
FIG. 12 is a diagram for explaining the placement of the two battery packs.

While a bottom face of the pack case 24 is in contact with the upper face of the pack case 16 in the present embodiment, the present invention is not limited thereto. Specifically, the battery packs 10A and 20A may be placed as shown in FIG. 12. In FIG. 12, the battery packs 10A and 20A are fixed to the vehicle body, and the battery pack 20A is located above the battery pack 10A. A partitioning plate 101 is placed between the battery packs 10A and 20A to separate the battery packs 10A and 20A from each other. While the partitioning plate 101 is placed between the battery packs 10A and 20A in the configuration shown in FIG. 12, the partitioning plate 101 may be omitted. In other words, the battery packs 10A and 20A may be placed in the vertical direction of the vehicle 100 at an interval therebetween.

As described in FIG. 8 and FIG. 9, the high-capacity assembled battery 20 is more susceptible to the temperature than the high-power assembled battery 10. In the present embodiment, the high-capacity assembled battery 20 is placed above the high-power assembled battery 10, so that heat produced in the high-capacity assembled battery 20 can be escaped to the outside easily. In other words, the high-capacity assembled battery 20 is placed at the position where it is less susceptible to the heat than the high-power assembled battery 10.

Since the high-capacity assembled battery 20 can readily dissipate heat, the deterioration of the high-capacity assembled battery 20 can be suppressed. As described in FIG. 9, the prevention of a high-temperature state in the high-capacity assembled battery 20 can suppress a reduction in capacity of the high-capacity assembled battery 20. On the other hand, since the high-power assembled battery 10 is less susceptible to the temperature than the high-capacity assembled battery 20, the high-power assembled battery 10 can be placed in the space located below the high-capacity assembled battery 20 (the space where heat tends to stay). Since the space located below the high-capacity assembled battery 20 is covered with the high-capacity assembled battery 20, the heat tends to stay in that space.

When the EV running mode has a higher priority than the HV running mode in running the vehicle 100, the frequency of use of the high-capacity assembled battery 20 is higher than that of the high-power assembled battery 10. When the EV running mode has a higher priority than the HV running mode, the vehicle 100 is run in the EV running mode immediately after the starting, and the EV running mode can be switched to the HV running mode when the running in the EV running mode cannot be performed any more, by way of example. At the high frequency of use of the high-capacity assembled battery 20, the high-capacity assembled battery 20 easily produces heat due to charge and discharge. Since the high-capacity assembled battery 20 is in the environment where it dissipates more heat than the high-power assembled battery 10 as described above, a temperature rise of the high-capacity assembled battery 20 can be suppressed.

The high-capacity assembled battery 20 can be charged with the electric power supplied from the external power source, and during the charge, the high-capacity assembled battery 20 produces more heat than the high-power assembled battery 10. The high-capacity assembled battery 20 is in the environment where it dissipates more heat than the high-power assembled battery 10, so that a temperature rise of the high-capacity assembled battery 20 can be suppressed.

For ensuring the running distance in the EV running mode, the high-capacity assembled battery 20 tends to have a size larger than that of the high-power assembled battery 10. When the number of the cells 22 is increased, the capacity of the high-capacity assembled battery 20 can be increased to extend the running distance in the EV running mode. The increased number of the cells 22 tends to increase the size of the high-capacity assembled battery 20. In the luggage space LS, the space located in upper portion of the vehicle 100 can be widened more easily than the space located in a lower portion of the vehicle 100. The placement of the high-capacity assembled battery 20 above the high-power assembled battery 10 as in the present embodiment can easily ensure the space for placing the high-capacity assembled battery 20.

For example, the high-power assembled battery 10 can be placed in the space also used for accommodating the spare tire, and the high-capacity assembled battery 20 can be placed above the high-power assembled battery 10. In this case, the space for placing the high-capacity assembled battery 20 is wider than the space for placing the high-power assembled battery 10. The capacity (in other words, the size) of the high-capacity assembled battery 20 can be changed to respond to the need of a user. The placement of the high-capacity assembled battery 20 above the high-power assembled battery 10 can cope with the change in size of the high-capacity assembled battery 20 associated with the changed capacity.

In view of only the placement of the assembled batteries 10 and 20 in the luggage space LS, it is contemplated that the high-capacity assembled battery 20 may be placed below the high-power assembled battery 10. In this case, the high-capacity assembled battery 20 is difficult to place along a flat surface, and the high-capacity assembled battery 20 may have a complicated outer shape. In the present embodiment, the placement of the high-capacity assembled battery 20 above the high-power assembled battery 10 makes it easy to place the high-capacity assembled battery 20 along a flat surface, which can avoid such a complicated outer shape in the high-capacity assembled battery 20.

Since the high-capacity assembled battery 20 is placed above the high-power assembled battery 10, an operator accesses the high-capacity assembled battery 20 more easily than the high-power assembled battery 10. If the high-capacity assembled battery 20 is placed below the high-power assembled battery 10, the operator needs to perform tasks such as removal of the high-power assembled battery 10 in order to access the high-capacity assembled battery 20.

The high-capacity assembled battery 20 may be more susceptible to the temperature than the high-power assembled battery 10 and suffer deterioration more easily. Especially when the EV running mode has a higher priority than the HV running mode, the high-capacity assembled battery 20 may be used at a frequency higher than that of the high-power assembled battery 10 and suffer deterioration more easily. When the high-capacity assembled battery 20 is deteriorated, at least part of the high-capacity assembled battery 20 needs replacement. In changing the capacity of the high-capacity assembled battery 20 in response to the need of a user, the high-capacity assembled battery 20 also needs replacement. Thus, the frequency of replacement of the high-capacity assembled battery 20 is higher than that of the high-power assembled battery 10. The placement of the high-capacity assembled battery 20 at the position easily accessed by the operator as in the present embodiment facilitates the replacement of the high-capacity assembled battery 20.

Figure 13:
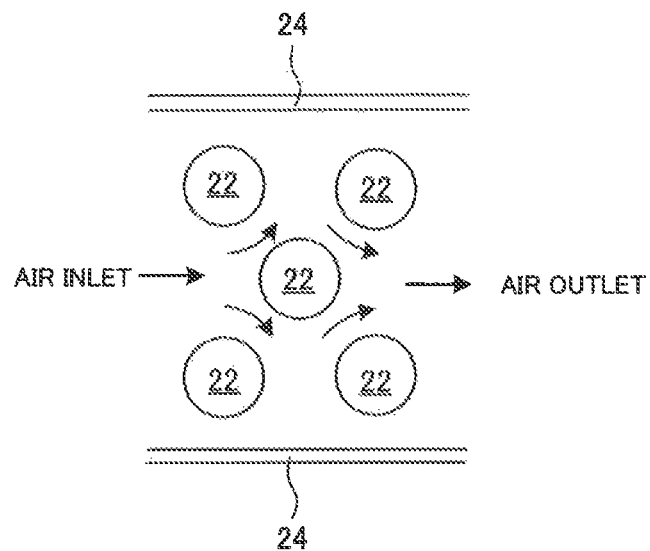
FIG. 13 is a diagram for explaining the flow of air used in temperature adjustment of the high-capacity assembled battery.
Figure 14:
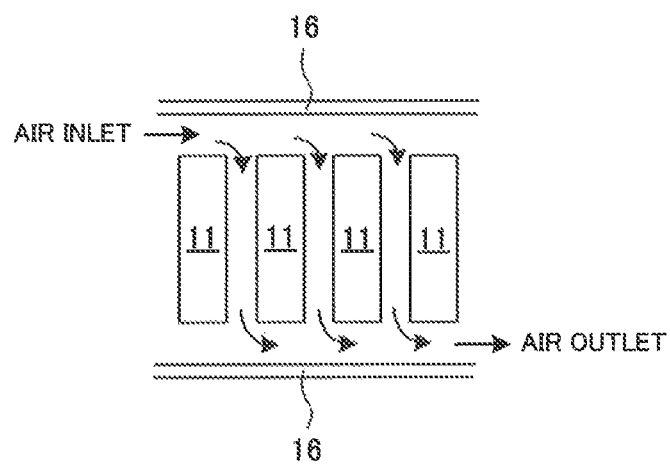
FIG. 14 is a diagram for explaining the flow of air used in temperature adjustment of the high-power assembled battery.

In adjusting the temperature of the high-capacity assembled battery 20, the air for temperature adjustment can be moved along the outer circumferences of the cylinder-type cells 22 as shown in FIG. 13. The air for temperature adjustment can be moved along a plane orthogonal to the longitudinal direction of the cell 22. In adjusting the temperature of the high-power assembled battery 10, the air for temperature adjustment passes through adjacent two of the cells 11 as shown in FIG. 14. Specifically, the air for temperature adjustment moves in the direction of the arrangement of the plurality of cells 11 and then enters between the adjacent two of the cells 11.

The air used for temperature adjustment of the high-capacity assembled battery 20 moves more smoothly than the air used for temperature adjustment of the high-power assembled battery 10. Specifically, the outer face of the cylinder-type cell 22 is formed of a curved face as shown in FIG. 4, so that the air moves smoothly along the outer circumferential face of the cell 22. On the other hand, in adjusting the temperature of the high-power assembled battery 10, the air for temperature adjustment should move in the direction of the arrangement of the plurality of cells 11 and then enter between the adjacent two of the cells 11. In other words, the moving direction of the air for temperature adjustment needs to be changed abruptly.

The flow path shown in FIG. 14 has a pressure loss which tends to be higher than that of the flow path shown in FIG. 13. Since the air can move smoothly along the outer circumferential face of the cell 22 in the flow path shown in FIG. 13, the pressure loss tends to be low. On the other hand, the air should enter between the adjacent two of the cells 11 in the flow path shown in FIG. 14, so that the pressure loss tends to be higher at the position where the air enters between the two cells 11. As the pressure loss is increased, noise is produced more easily.

When an air inlet port is provided for each of the pack cases 16 and 24 in the configuration shown in FIG. 11 or FIG. 12, the noise produced in the high-power assembled battery 10 may passes through the air inlet port toward the riding space RS. Since the high-capacity assembled battery 20 covers the upper face of the high-power assembled battery 10 in the present embodiment, the high-capacity assembled battery 20 can block the noise directed from the high-power assembled battery 10 toward the riding space RS. This can prevent the noise produced in the high-power assembled battery 10 from reaching passengers present in the riding space RS.

Figure 15:
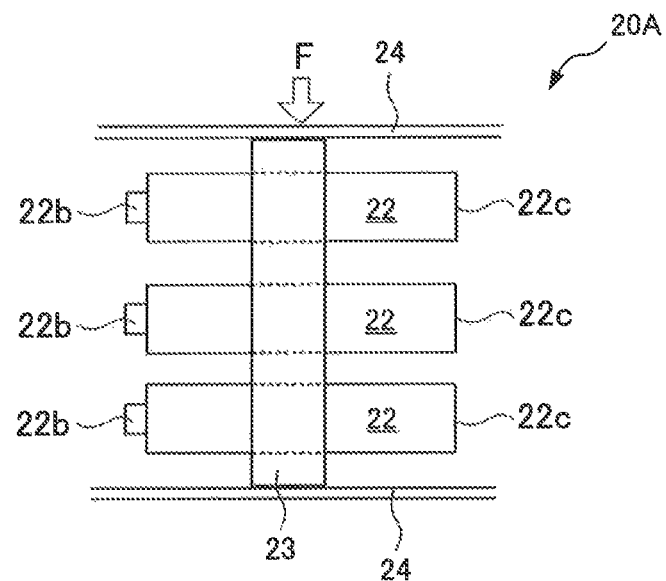
FIG. 15 is a schematic diagram showing the configuration of the battery pack for the high-capacity assembled battery.
Figure 16:
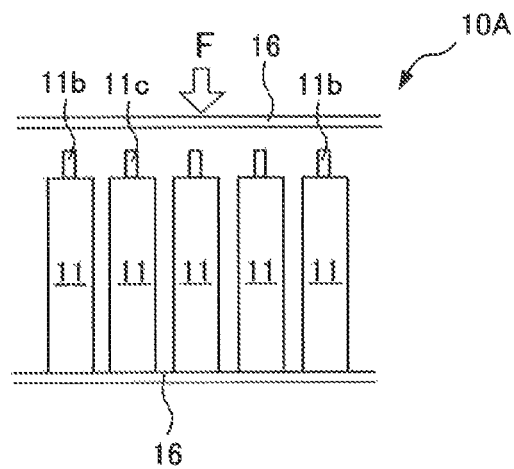
FIG. 16 is a schematic diagram showing the configuration of the battery pack for the high-power assembled battery.

The battery pack 20A tends to be more rigid than the battery pack 10A. Specifically, as shown in FIG. 15, the cells 22 of the high-capacity assembled battery 20 are held by the holder 23 in the battery pack 20A, and the pack case 24 is in contact with end faces of the holder 23. Even when an external force F is applied to the pack case 24, the holder 23 can receive the external force. In the battery pack 10A, the electrodes 11b and 11c are provided at the top of the high-power assembled battery 10 (cells 11), and the pack case 16 is separate from the electrodes 11b and 11c as shown in FIG. 16. Thus, when an external force F is applied to the pack case 16, the pack case 16 is distorted easily.

Since the space for accommodating luggage or the like is present above the battery pack 20A, the battery pack 20A often receives the external force when the luggage or the like is put. Since the battery pack 20A is more rigid than the battery pack 10A as described above, the battery pack 20A can easily receive the external force.

The invention claimed is:

1. A vehicle comprising:
   a motor serving as a driving source for running the vehicle; and
   a high-power assembled cells and a high-capacity assembled cells each capable of supplying an electric power to the motor and placed in a luggage space, the high-power assembled cells and the high-capacity assembled cells constituted by secondary cells, respectively,
   wherein
   the high-power assembled cells are capable of charge and discharge with a current relatively larger than that in the high-capacity assembled cells,
   the high-capacity assembled cells have an energy capacity relatively larger than that of the high-power assembled cells, have a higher dependence of cell characteristic on temperature than that of the high-power assembled cells, and are placed over the high-power assembled cells in the vehicle,
   the cell characteristic represents both of reduction rate of capacity retention rate of the respective secondary cells with respect to temperature rise and reduction rate of output performance of the respective secondary cells with respect to temperature drop,
   the respective secondary cells have a positive electrode component, a negative electrode component and a separator placed between the positive electrode component and the negative electrode component, the positive electrode component having a positive collector plate and a positive electrode active material layer formed on a surface of the positive collector plate, the negative electrode component having a negative collector plate and a negative electrode active material layer formed on a surface of the negative collector plate,
   the positive electrode active material layers of the respective secondary cells of the high-power assembled cells have a thickness smaller than that of the positive electrode active material layers of the respective secondary cells of the high-capacity assembled cells,
   the negative electrode active material layers of the respective secondary cells of the high-power assembled cells have a thickness smaller than that of the negative electrode active material layers of the respective secondary cells of the high-capacity assembled cells,
   the positive electrode active material layers of the high-power assembled cells have a volume per unit capacity that is larger than a volume per unit capacity of the positive electrode active material layers of the high-capacity assembled cells, and
   the negative electrode active material layers of the high-power assembled cells have a volume per unit capacity that is larger than a volume per unit capacity of the negative electrode active material layers of the high-capacity assembled cells.

2. The vehicle according to claim 1, further comprising an engine serving as a driving source for running the vehicle,
   wherein, in running of the vehicle using an output from the motor with the engine stopped, the high-capacity assembled cells supply a more electric power to the motor than that from the high-power assembled cells.

3. The vehicle according to claim 2, wherein, in the running of the vehicle using the output from the motor with the engine stopped, a frequency of use of the high-capacity assembled cells is higher than a frequency of use of the high-power assembled cells.

4. The vehicle according to claim 2, wherein, in running of the vehicle using the output from the motor with the engine stopped, a proportion of the electric power supplied from the high-capacity assembled cells to the motor in the electric power supplied to the motor is higher than a proportion of the electric power supplied from the high-power assembled cells to the motor.

5. The vehicle according to claim 1, wherein the secondary cells of high-power assembled cells are connected in series, and
   the secondary cells of the high-capacity assembled cells are connected in parallel.

6. The vehicle according to claim 5, wherein a battery pack includes the high-power assembled cells being a plurality of square-type cells and placed side by side in a predetermined direction and a case accommodating the plurality of square-type cells, and
   a battery pack includes the high-capacity assembled cells being a plurality of cylinder-type cells extending in a direction orthogonal to a predetermined plane and placed in order within the predetermined plane, a holder having through holes into which each of the plurality of cylinder-type cells is inserted and supporting each of the cylinder-type cells, and a case accommodating the plurality of cylinder-type cells and contacting with an end face of the holder.

7. The vehicle according to claim 6, wherein a heat exchange medium used in temperature adjustment of the high-power assembled cells enters into space formed between two of the cells adjacent in the predetermined direction to exchange heat with the high-power assembled cells, and
   a heat exchange medium used in temperature adjustment of the high-capacity assembled cells moves along the predetermined plane to exchange heat with the high-capacity assembled cells.

8. The vehicle according to claim 1, wherein the high-capacity assembled cells are charged with an electric power supplied from an external power source.

9. The vehicle according to claim 1, wherein the high-capacity assembled cells have a size larger than that of the high-power assembled cells.

10. The vehicle according to claim 1, wherein the high-capacity assembled cells are replaced at a frequency higher than that of the high-power assembled cells.

\* \* \* \* \*